June 10, 1958 — H. W. JACOBS — 2,837,779
INSULATION PRODUCT
Filed Sept. 15, 1953
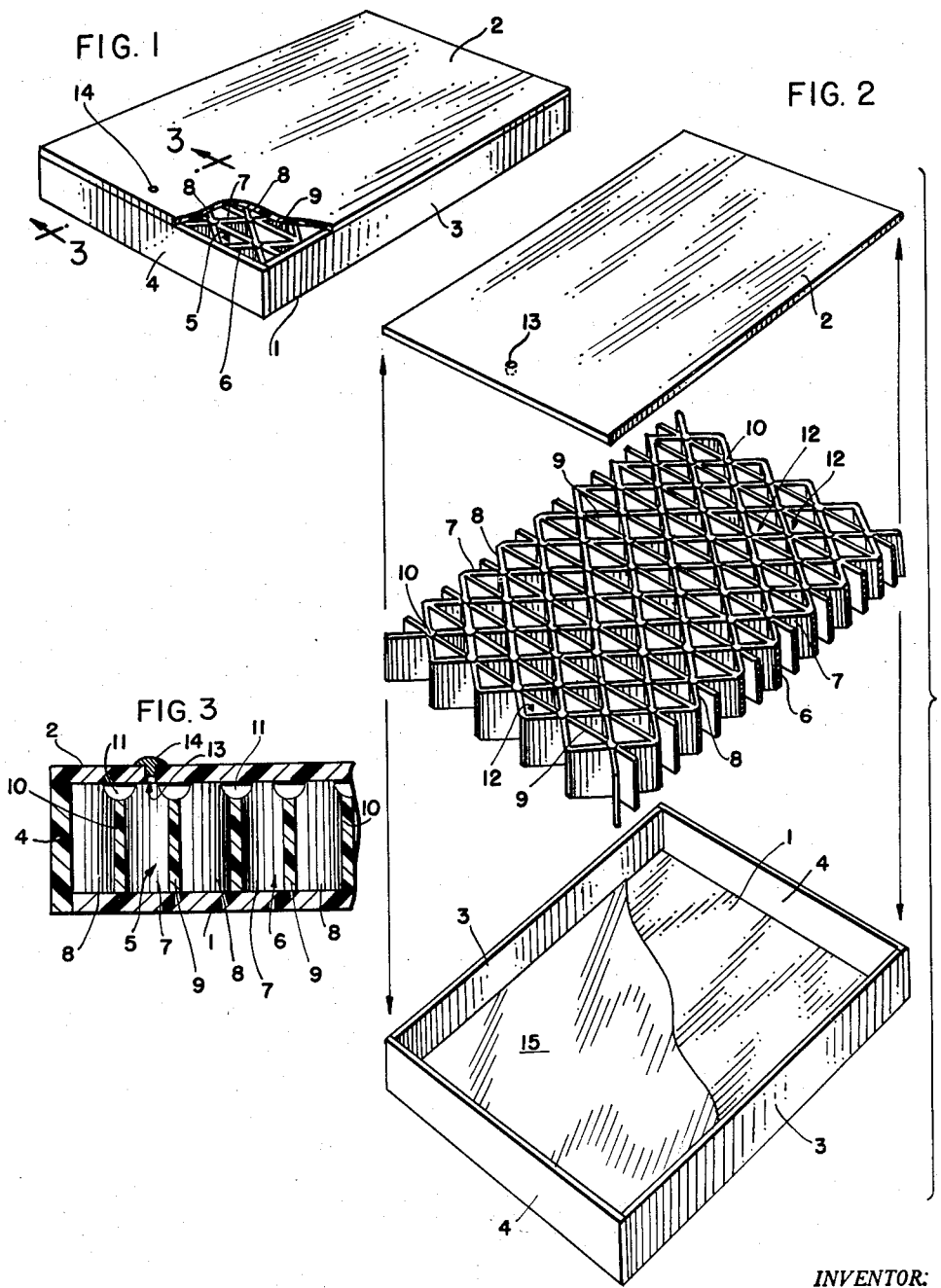
INVENTOR:
HAROLD W. JACOBS
BY Marshall, Johnston, Cook & Root,
ATT'YS

United States Patent Office 2,837,779
Patented June 10, 1958

2,837,779
INSULATION PRODUCT
Harold W. Jacobs, Chicago, Ill.

Application September 15, 1953, Serial No. 380,197

1 Claim. (Cl. 20—4)

This invention relates to an insulation product.

The invention in general comprises relatively thin opposed walls or surfaces sealed to enclosing end and side walls to form an inner chamber. Air is withdrawn to form a vacuum in the chamber inside the enclosure. Interior supporting means or bridgework may be arranged in the chamber to support the opposed surfaces to prevent collapsing or deformation of the enclosing side walls after air is extracted.

The product of the invention may be used wherever practicable for insulation purposes for wall or ceiling construction in buildings, automobiles, airplanes or other articles or appurtenances.

An important object of the present invention is to provide an insulation element or device having a vacuum formed within a chamber formed by enclosing hermetically sealed walls with supporting means arranged in the chamber interiorly of the enclosure to prevent the walls of the element or device from collapsing or sagging because of the vacuum in the chamber, the supporting means being so constructed and arranged that the air from the interior of the product may be withdrawn.

Another important object of the invention is the provision of a new and improved product having insulation qualities by extracting air from the interior chamber of hermetically sealed enclosing walls, there being a support or bridgework arranged within the enclosing walls and vented so that air may be extracted through a single hole at one particular point in one wall to permit a vacuum to be created inside of the product, the said extracting hole being later sealed so as to maintain the vacuum.

A further object of the invention consists in the provision of a new and improved method of making an insulation product which comprises forming enclosing walls which are hermetically sealed to form an inner chamber, providing supporting means within the chamber to prevent sagging or collapsing of any of the wall structure, extracting the air from the chamber to provide a vacuum therein and sealing the extraction opening after air has been withdrawn from the chamber.

Numerous other objects and advantages will be apparent throughout the process of the application which follows.

The accompanying drawing illustrates one selected embodiment only of the invention, and the views therein are as follows:

Fig. 1 is a detail perspective view of one form of insulation product, parts being broken away to show the interior thereof;

Fig. 2 is a detail exploded view showing the various parts which constitute the completed element disclosed in Fig. 1; and Fig. 3 is a detail transverse sectional view on the line 3—3 of Fig. 1.

The insulation product herein disclosed for the purposes of the present invention may be of any size or shape which is practical for the purposes intended. The drawing shows the product as being rectangular, but it may be of any desired shape or configuration capable of performing the function intended. The product, as shown in the drawing, comprises a bottom wall or panel 1, and an opposed spaced top wall or panel 2. Each of these walls may have hermetically sealed thereto enclosing side walls 3, 3 and enclosing end walls 4, 4, to form an hermetically sealed interior chamber 5.

A supporting structure 6, such as latticed bridgework, may be mounted on top of the bottom wall 1, and the top wall 2 then placed in position with its underside abutting flush against the upper edges of the enclosing side and end walls 3 and 4. The top and bottom are fixed or sealed to the surrounding frame made up by the sides and ends 3, 3 and 4, 4, respectively.

The supporting or abridging structure 6, as shown, may be formed by diagonal cross members 7 and 8 reinforced by transverse members 9. These latter three members are joined as indicated at 10, Fig. 2. Cutouts or vents 11 may be formed in the members, as shown in Fig. 3, to provide free ventilation to all the pockets 12 which are formed by members 7, 8 and 9 whereby air within the sealed chamber 5 may be withdrawn through an opening 13 preferably provided in the top wall or panel 2. After the air is withdrawn from the sealed enclosure, with the bridging 6 arranged in place, and the air in the chamber extracted to form a vacuum therein, the opening 13 is sealed by a closure 14, whereby there is formed a completely hermetically sealed enclosure having an interior vacuum chamber to provide excellent and extremely efficient insulation. The purpose of the supporting means or bridging structure 6 is to prevent the opposed walls 1 and 2 from collapsing, sagging or otherwise becoming deformed.

The interior supporting structure 6, as herein shown, is disclosed as being crisscross latticework with vents 11 so that the air may be completely withdrawn from every one of the pockets 12 which are formed by the angular cross members 7 and 8 and the transverse member 9. This latter construction, however, may be of any kind desired, and it may be in the form of circular upper and lower plates with stems connected therebetween (not shown). It is immaterial as to the type of interior support used as any suitable interior structure may be substituted just so long as it will maintain the enclosing walls from sagging or collapsing. Also, instead of making the bottom wall 1 with attached enclosing walls 3 and 4, the walls 3 and 4 may be just half the height and applied to both the bottom and top members 1 and 2. In the latter arrangement the seal would be made intermediate the bottom and top walls.

Another adaptation could be the sealing of the panels 1 and 2 directly to the lattice support 6. In this latter event, however, there would be no vents in the exterior surfaces, but there still would be vents 11 leading to the pockets 12 formed by the members 7, 8 and 9. It makes no difference what the shape of the structure is, or its size, or what kind of interior support is provided, just so long as there is an hermetically sealed container or housing with an inner vacuum chamber arranged therein. Also, there may be cases where it will not be necessary to have any interior support 6, providing the enclosing walls are of sufficient thickness to sustain the amount of vacuum necessary. The greater the vacuum, the greater insulation is provided by the product.

The single embodiment shown in the drawing comprises plastic material for the enclosing walls. There is an advantage in using plastic in that the joints may be sealed by heat should thermo-plastic material be used. Other plastic material may be such that a solvent may be used to seal the walls. Nonreversible plastic, such as "Bakelite," may be used, with the joints sealed by a plasticizer. Clear thermoplastic, such as polystyrene, is deemed highly desirable because of ease in manufacture and sealing, also in that one or more surfaces, preferably an inner surface, may have reflecting material, as indicated at 15, applied thereto to reflect heat and thereby overcome radiation to a considerable extent and increase the insulation efficiency of the product. The product also may be made of other materials, such as sheet metal, ceramic material, glass or any other material which is nonporous so that air will not seep into the vacuum chamber.

The product may be of any size, shape and configuration desirable to suit the purpose for which it is intended. It may be rectangular, as shown, or wedge-shaped, triangular, octagonal, round, or any other proper shape.

In cases where the product is to be for walls and ceilings it may be desirable to score, serrate, or otherwise form rough surfaces so that the product may be plastered on either one or both sides.

The invention provides an insulation product or construction element for any use found desirable in practically any type of construction.

Changes may be made in the form, construction and arrangement of the parts without departing from the spirit of the invention and the method may be varied, and the right is hereby reserved to make all such changes as fall within the scope of the following claim.

The invention is claimed as follows:

An insulation construction element comprising a shell of transparent plastic material having flat parallel top and bottom walls, flat parallel side walls, and flat parallel end walls, said walls being continuously sealed to one another along the edges thereof and providing a hermetically sealed oblong enclosure, a cellular core unit within said enclosure said core unit comprising a plurality of spaced straight strips parallel with said end walls and having their opposite ends abutting the inner sides of said side walls, and a plurality of zigzag strips disposed between said parallel strips, said zigzag strips having exterior angle portions thereof abutting said parallel strips and sealed thereto providing a rigid self-sustaining latticed bridgework, said straight and zigzag strips having straight bottom edges engaging against the inner side of said bottom wall, there being cut-outs in the upper edges of said straight and zigzag strips at the junctures thereof with one another, said cut-outs providing vents between cells formed by said straight and zigzag strips, the remainder of said upper edges engaging against the inner side of said top wall, and a sealable opening and seal therefor in one of said walls, whereby the air within the interior of said enclosure may be evacuated.

References Cited in the file of this patent

UNITED STATES PATENTS

| | | |
|---|---|---|
| 1,124,778 | Meuler | Jan. 12, 1915 |
| 1,239,770 | Coleman | Sept. 11, 1917 |
| 1,610,380 | Hutton | Dec. 14, 1926 |
| 1,793,039 | Yetter | Feb. 17, 1931 |
| 1,865,424 | Banta | July 5, 1932 |
| 1,984,007 | Babbitt | Dec. 11, 1934 |
| 2,181,358 | LeGall | Aug. 29, 1939 |
| 2,644,777 | Havens | July 7, 1953 |

FOREIGN PATENTS

| | | |
|---|---|---|
| 404,303 | France | Nov. 29, 1909 |